3,313,120
EVAPORATIVE CONDENSER
Richard J. Kuss, Syracuse, and Richmond S. Hayes, Fayetteville, N.Y., assignors to Carrier Corporation, Syracuse, N.Y., a corporation of Delaware
Filed May 2, 1966, Ser. No. 546,847
5 Claims. (Cl. 62—188)

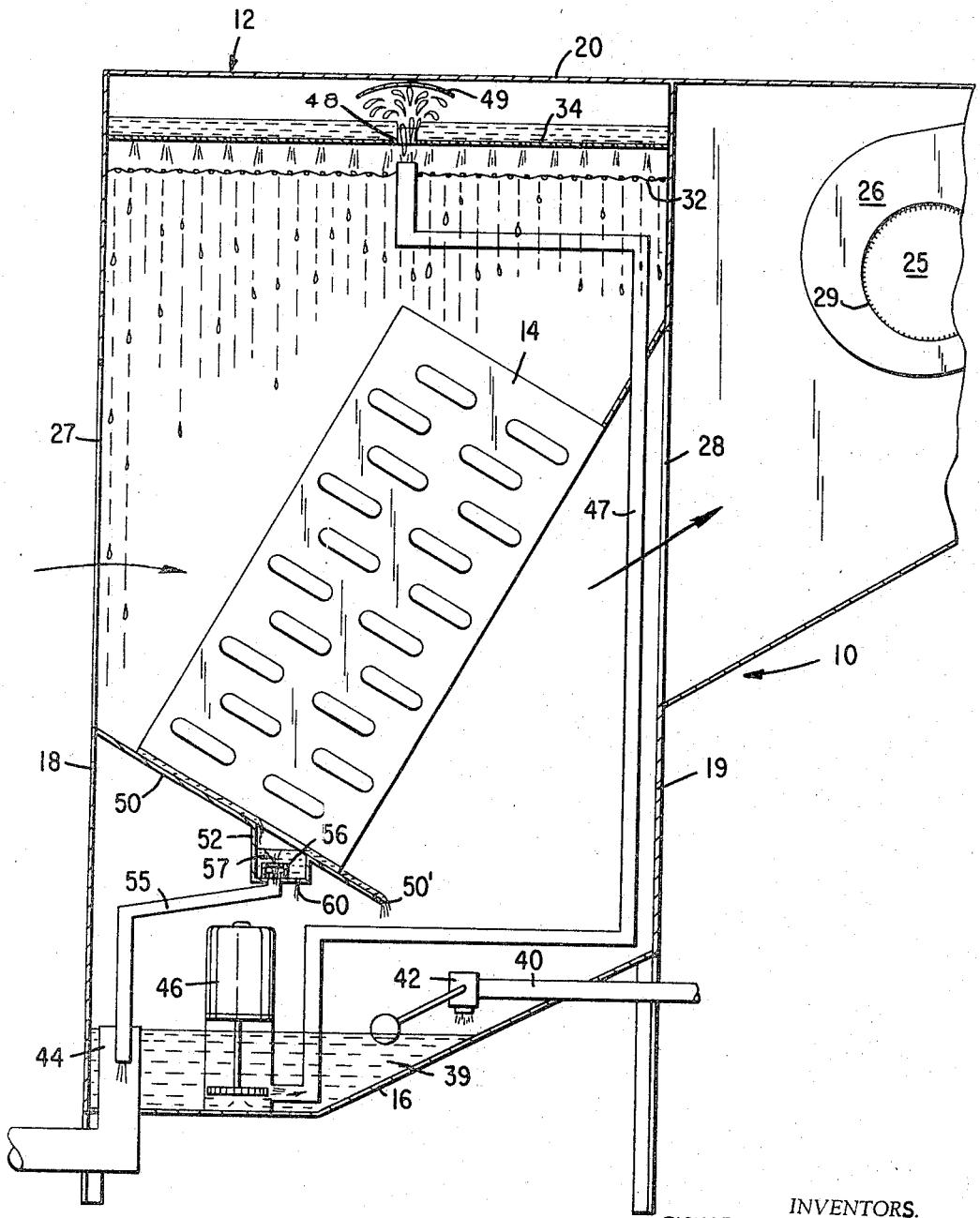

This invention relates to evaporative type condensers and, more particularly, to a water bleed-off arrangement for an evaporative type condenser.

In evaporative type condensers, the condensing coil is wetted by water or other suitable liquid to enhance the effectiveness of the coil. A portion of the water is vaporized upon contact with the relatively hot portion of the coil; in localities where the water is relatively hard, scale and other solid substances and contaminants may form. Where allowed to concentrate, the scale and other contaminants can materially reduce the effectiveness of the evaporative condensing unit. To reduce accumulation of scale and contaminants, a portion of the water may be continuously removed from the system. However, known arrangements for removing or bleeding water from the system are not amenable to ready and inexpensive field alternation to permit the installer to change the bleed-off rate in accordance with local water conditions.

It is a principal object of the present invention to provide a new and improved evaporative condensing unit.

It is a further object of the present invention to provide an improved construction for draining a predetermined part of the water from an evaporative condenser.

It is a further object of the present invention to provide a water bleed-off arrangement for an evaporative condenser which facilitates changing of the water bleed-off rate to accommodate local water conditions.

This invention relates to an evaporative condensing unit comprising, in combination, a housing, the lower part of the housing forming a liquid accumulating sump; at least one heat exchanger coil arranged within the housing; means for bringing air into heat exchange relation with the coil, the air circulating means including a fan; means for distributing liquid from the sump over the heat exchanger coil to wet the coil, said liquid distributing means including a pump; liquid supply means responsive to liquid level conditions in the sump for adding make-up liquid to the sump; means to prevent overfilling of the sump including a drain; a liquid collecting pan arranged between the coil and the sump; the collecting pan being sized to intercept substantially all of the liquid draining from the coil, the pan being arranged so that liquid striking the pan flows along the pan over one end thereof into the sump; and liquid bleed-off means disposed athwart the path of flow of liquid over the pan adapted to remove a predetermined portion of the liquid from the apparatus, the liquid bleed-off means including a conduit communicating with the drain.

Other objects and advantages will be apparent from the ensuing description and drawing in which:

The figure is a view partially in section showing the evaporative condensing unit of the present invention.

Referring to the drawing, there is shown an evaporative type condensing unit 10 adapted for use with a refrigeration system. Condensing unit 10 includes a housing or enclosure 12 having heat exchanger coil 14 disposed therewithin. Housing 12 includes a base 16, sides 18, 19 and top 20. Coil 14, which comprises the condenser for a suitable refrigeration system (not shown), is angularly positioned within housing 12. Fan 25, having scroll 26 thereof attached to side 19 of housing 12, draws cooling outdoor air through inlet 27 in housing side 18 across heat exchanger coil 14 and through opening 28 in side 19 into fan inlet 29. Air discharged from fan 25 is returned to the atmosphere. While fan 25 is shown arranged on the downstream side of coil 14, it is understood that fan 25 may be arranged upstream of coil 14 so as to discharge air thereover.

To enhance the cooling effect of the air stream passing over coil 14, coil 14 is continuously wetted by a fine mist of water or other suitable heat exchange liquid discharged thereover from water distributing pans 32, 34. Water distributing pan 32 is preferably comprised of a screen-like material while pan 34, arranged above pan 32, is comprised of a sheet metal member having a plurality of small openings 35 therethrough. Pan 34 normally holds a supply of water as will be more apparent hereinafter.

Sump 39 in the lower portion of housing 12, collects and stores water falling from coil 14. Water supply line 40 opens into sump 39. Float actuated valve 42 in line 40 feeds controlled amounts of make-up water into sump 39 to replenish water lost due to evaporation and bleed off. Standpipe 44 which leads to a suitable drain (not shown) prevents overfilling of sump 39.

A suitable water pump 46 discharges water drawn from sump 39 through conduit 47 into water distributing pan 34. The terminal end of conduit 47 projects above pan 32 and water discharged from conduit 47 passes upwardly through opening 48 in pan 34 into pan 34. Deflector 49, arranged thereabove, disperses the water stream.

During operation of the evaporative condensing unit 10, coil 14 is wetted by the fine mist of water rained thereupon by distributing pans 32, 34 and outdoor air drawn thereacross by fan 25 cools and condenses the relatively hot vaporous refrigerant flowing through coil 14. The warmed air is discharged by fan 25 to the outdoors. Pump 46, which recycles water in sump 39, functions to maintain an adequate supply of water in pan 34.

A portion of the water falling over coil 14 is normally vaporized by the relatively hot refrigerant medium flowing through coil 14, the vaporized water being carried into the atmosphere by the air stream flowing across coil 14. Valve 42 replenishes water lost. Vaporization of the water, however, may result in scale and other solid substances and contaminants forming on coil 14 and the internal parts of the unit 10. Scale formation is a particularly serious problem in localities where the water is relatively hard.

If a portion of the water returning to sump 39 from coil 14 is continuously removed or bled off, the concentration of scale and other contaminants can be controlled. The amount of water that should be bled off to provide effective scale control varies with the hardness of the water.

Run-off pan 50 is arranged under coil 14 so as to intercept substantially all of the water draining therefrom. Pan 50, which is tilted so as to parallel the lower part of coil 14, includes a trough-like portion 52 extending transversely thereacross and preferably at or adjacent to the lowermost edge 50' of pan 50. Water falling onto pan 50 from coil 14 flows downwardly along the extent thereof into trough 52 and from trough 52 over edge 50' into sump 39.

Drain line 55 connected to the bottom of trough 52 opens into standpipe 44 and the system drain. To permit varying the rate of bleed-off water in accordance with the hardness of the water used, a cap-like member 56, having a suitably sized bleed-off orifice 57, is positioned over the open end of drain line 55.

In operation, a portion of the water including scale and other solid particles falling off coil 14 onto pan 50 and into trough 52 is bled from the system through drain line 55. The bleed of water and scale reduces the concentration of scale and other contaminants. By the use of caps having various size orifice openings, the effective size of drain line 55 and hence the rate of bleed can be controlled in accordance with the hardness conditions of the water used.

To prevent freeze-up damage to the unit on shutdown, pan 50 preferably has one or more small openings or orifices 60 therein (not shown) to insure drainage thereof on shutdown.

While coil 14 is illustrated in an angular or tilted position, it is understood that the coil 14 may be vertically disposed. In that arrangement, air drawn through coil 14 by fan 25 causes water striking pan 50 to flow therealong in the direction of the air stream. Trough 52 is arranged in that construction adjacent the downstream end of pan 50.

While we have described a preferred embodiment of our invention, it will be understood that the invention is not limited thereto since it may be otherwise embodied within the scope of the following claims.

We claim:

1. In an evaporative condensing unit, the combination of: a housing, the lower part of said housing forming a liquid accumulating sump; at least one heat exchanger coil arranged within said housing; means for bringing air into heat exchange relation with said coil, said air circulating means including a fan; means for distributing liquid from said sump over said heat exchanger coil to wet said coil and promote the interchange of heat between said coil and said air, said liquid distributing means including a pump; liquid supply means responsive to liquid level conditions in said sump for adding make-up liquid to said sump; means to prevent overfilling of said sump including a drain; a liquid collecting pan arranged between said coil and said sump, said collecting pan being sized to intercept substantially all of the liquid draining from said coil, said pan being arranged so that liquid striking said pan flows along said pan over one end thereof into said sump; and liquid bleed-off means disposed athwart the path of flow of liquid over said pan adapted to remove a predetermined portion of said liquid from said apparatus, said liquid bleed-off means including a conduit communicating with said drain.

2. An evaporative condensing unit according to claim 1 in which said liquid bleed-off means comprises a trough-like recess extending transversely across said pan, said recess being proximate said one end of said pan.

3. An evaporative condensing unit according to claim 1 including means for controlling the rate of liquid bleed-off, said control means comprising an orifice defining member in said conduit changeable to vary the size of said drain conduit.

4. An evaporative condensing unit according to claim 2 in which said trough-like recess has at least one port in the lower portion thereof to permit drainage of liquid therefrom upon shut-down of said apparatus.

5. An evaporative condensing unit according to claim 1 in which said pan is substantially horizontal, air circulating through said unit by said fan moving liquid striking said pan in a concurrent direction on said pan and over the downstream edge on said pan into said sump.

References Cited by the Examiner
UNITED STATES PATENTS

| | | | |
|---|---|---|---|
| 2,680,599 | 6/1954 | Wile | 62—171 |
| 2,840,352 | 6/1958 | Ghai | 62—305 |

WILLIAM J. WYE, *Primary Examiner.*